(12) United States Patent
Newman et al.

(10) Patent No.: US 10,529,052 B2
(45) Date of Patent: ***Jan. 7, 2020

(54) VIRTUAL LENS SIMULATION FOR VIDEO AND PHOTO CROPPING

(71) Applicant: GoPro, Inc., San Mateo, CA (US)

(72) Inventors: David A. Newman, San Diego, CA (US); Joshua Edward Bodinet, San Diego, CA (US); Otto Kenneth Sievert, Oceanside, CA (US); Timothy MacMillan, La Honda, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/535,940

(22) Filed: Aug. 8, 2019

(65) Prior Publication Data

US 2019/0362464 A1 Nov. 28, 2019

Related U.S. Application Data

(63) Continuation of application No. 16/229,512, filed on Dec. 21, 2018, now Pat. No. 10,395,338, which is a (Continued)

(51) Int. Cl.
*G06T 3/00* (2006.01)
*G06T 5/00* (2006.01)
*G06T 3/40* (2006.01)

(52) U.S. Cl.
CPC .............. *G06T 3/0018* (2013.01); *G06T 3/00* (2013.01); *G06T 3/40* (2013.01); *G06T 5/006* (2013.01);
(Continued)

(58) Field of Classification Search
None
See application file for complete search history.

(56) References Cited

U.S. PATENT DOCUMENTS 5,130,794 A 7/1992 Ritchey
6,323,934 B1 * 11/2001 Enomoto ................ G06T 5/006
355/32
(Continued)

FOREIGN PATENT DOCUMENTS

WO 2001020466 3/2001
WO 2009040538 A1 4/2009
WO 2009146319 A1 12/2009

OTHER PUBLICATIONS

Ernoult, Emeric, 'How to Triple Your YouTube Video Views with Facebook', SocialMediaExaminer.com, Nov. 26, 2012, 16 pages.
(Continued)

*Primary Examiner* — Jwalant Amin
(74) *Attorney, Agent, or Firm* — Esplin & Associates, PC

(57) ABSTRACT

In a video capture system, a virtual lens is simulated when applying a crop or zoom effect to an input video. An input video frame is received from the input video that has a first field of view and an input lens distortion caused by a lens used to capture the input video frame. A selection of a sub-frame representing a portion of the input video frame is obtained that has a second field of view smaller than the first field of view. The sub-frame is processed to remap the input lens distortion to a desired lens distortion in the sub-frame. The processed sub-frame is the outputted.

20 Claims, 6 Drawing Sheets

Related U.S. Application Data continuation of application No. 15/157,207, filed on May 17, 2016, now Pat. No. 10,186,012.

(60) Provisional application No. 62/164,409, filed on May 20, 2015.

(52) U.S. Cl.
CPC ........... *G06T 2207/10004* (2013.01); *G06T 2207/10016* (2013.01); *G06T 2207/20021* (2013.01); *G06T 2210/22* (2013.01)

(56) References Cited

U.S. PATENT DOCUMENTS

| | | | |
|---|---|---|---|
| 6,337,683 B1 | 1/2002 | Gilbert | |
| 6,593,956 B1 | 7/2003 | Potts | |
| 7,222,356 B1 | 5/2007 | Yonezawa | |
| 7,483,618 B1 | 1/2009 | Edwards | |
| 8,446,433 B1 | 5/2013 | Mallet | |
| 8,611,422 B1 | 12/2013 | Yagnik | |
| 8,718,447 B2 | 5/2014 | Yang | |
| 8,730,299 B1 | 5/2014 | Kozko | |
| 8,763,023 B1 | 6/2014 | Goetz | |
| 8,910,046 B2 | 12/2014 | Matsuda | |
| 8,988,509 B1 | 3/2015 | Macmillan | |
| 9,032,299 B2 | 5/2015 | Lyons | |
| 9,036,001 B2 | 5/2015 | Chuang | |
| 9,077,956 B1 | 7/2015 | Morgan | |
| 9,105,080 B2* | 8/2015 | McAndrew | G06T 7/80 |
| 9,111,579 B2 | 8/2015 | Meaney | |
| 9,142,253 B2 | 9/2015 | Ubillos | |
| 9,151,933 B2 | 10/2015 | Sato | |
| 9,204,039 B2 | 12/2015 | He | |
| 9,208,821 B2 | 12/2015 | Evans | |
| 9,245,582 B2 | 1/2016 | Shore | |
| 9,253,533 B1 | 2/2016 | Morgan | |
| 9,262,807 B2* | 2/2016 | Stec | G06T 5/006 |
| 9,317,172 B2 | 4/2016 | Lyons | |
| 9,423,944 B2 | 8/2016 | Eppolito | |
| 9,473,758 B1 | 10/2016 | Long | |
| 9,479,697 B2 | 10/2016 | Aguilar | |
| 9,564,173 B2 | 2/2017 | Swenson | |
| 2002/0044153 A1* | 4/2002 | Hoch | H04N 5/222 345/647 |
| 2004/0128317 A1 | 7/2004 | Sull | |
| 2005/0025454 A1 | 2/2005 | Nakamura | |
| 2006/0122842 A1 | 6/2006 | Herberger | |
| 2007/0173296 A1 | 7/2007 | Hara | |
| 2007/0204310 A1 | 8/2007 | Hua | |
| 2007/0229665 A1* | 10/2007 | Tobiason | H04N 5/3572 348/187 |
| 2007/0230461 A1 | 10/2007 | Singh | |
| 2008/0044155 A1 | 2/2008 | Kuspa | |
| 2008/0123976 A1 | 5/2008 | Coombs | |
| 2008/0152297 A1 | 6/2008 | Ubillos | |
| 2008/0163283 A1 | 7/2008 | Tan | |
| 2008/0177706 A1 | 7/2008 | Yuen | |
| 2008/0208791 A1 | 8/2008 | Das | |
| 2008/0253735 A1 | 10/2008 | Kuspa | |
| 2008/0313541 A1 | 12/2008 | Shafton | |
| 2009/0213270 A1 | 8/2009 | Ismert | |
| 2009/0274339 A9 | 11/2009 | Charles Cohen | |
| 2009/0327856 A1 | 12/2009 | Mouilleseaux | |
| 2010/0045773 A1 | 2/2010 | Ritchey | |
| 2010/0064219 A1 | 3/2010 | Gabrisko | |
| 2010/0086216 A1 | 4/2010 | Lee | |
| 2010/0104261 A1 | 4/2010 | Liu | |
| 2010/0183280 A1 | 7/2010 | Beauregard | |
| 2010/0231730 A1 | 9/2010 | Ichikawa | |
| 2010/0245626 A1 | 9/2010 | Woycechowsky | |
| 2010/0251295 A1 | 9/2010 | Amento | |
| 2010/0278504 A1 | 11/2010 | Lyons | |
| 2010/0278509 A1 | 11/2010 | Nagano | |
| 2010/0281375 A1 | 11/2010 | Pendergast | |
| 2010/0281386 A1 | 11/2010 | Lyons | |
| 2010/0287476 A1 | 11/2010 | Sakai | |
| 2010/0299630 A1 | 11/2010 | McCutchen | |
| 2010/0318660 A1 | 12/2010 | Balsubramanian | |
| 2010/0321471 A1 | 12/2010 | Casolara | |
| 2011/0025847 A1 | 2/2011 | Park | |
| 2011/0069148 A1 | 3/2011 | Jones | |
| 2011/0069189 A1 | 3/2011 | Venkataraman | |
| 2011/0075990 A1 | 3/2011 | Eyer | |
| 2011/0093798 A1 | 4/2011 | Shahraray | |
| 2011/0109774 A1 | 5/2011 | Onomura | |
| 2011/0134240 A1 | 6/2011 | Anderson | |
| 2011/0173565 A1 | 7/2011 | Ofek | |
| 2011/0206351 A1 | 8/2011 | Givoly | |
| 2011/0211040 A1 | 9/2011 | Lindemann | |
| 2011/0249153 A1* | 10/2011 | Hirooka | B60R 1/00 348/241 |
| 2011/0258049 A1 | 10/2011 | Ramer | |
| 2011/0293250 A1 | 12/2011 | Deever | |
| 2011/0320322 A1 | 12/2011 | Roslak | |
| 2012/0014673 A1 | 1/2012 | O'Dwyer | |
| 2012/0027381 A1 | 2/2012 | Kataoka | |
| 2012/0030029 A1 | 2/2012 | Flinn | |
| 2012/0057852 A1 | 3/2012 | Devleeschouwer | |
| 2012/0123780 A1 | 5/2012 | Gao | |
| 2012/0127169 A1 | 5/2012 | Barcay | |
| 2012/0206565 A1 | 8/2012 | Villmer | |
| 2012/0311448 A1 | 12/2012 | Achour | |
| 2013/0024805 A1 | 1/2013 | In | |
| 2013/0044108 A1 | 2/2013 | Tanaka | |
| 2013/0058532 A1 | 3/2013 | White | |
| 2013/0063561 A1 | 3/2013 | Stephan | |
| 2013/0078990 A1 | 3/2013 | Kim | |
| 2013/0127636 A1 | 5/2013 | Aryanpur | |
| 2013/0136193 A1 | 5/2013 | Hwang | |
| 2013/0142384 A1 | 6/2013 | Ofek | |
| 2013/0151970 A1 | 6/2013 | Achour | |
| 2013/0166303 A1 | 6/2013 | Chang | |
| 2013/0191743 A1 | 7/2013 | Reid | |
| 2013/0195429 A1 | 8/2013 | Fay | |
| 2013/0197967 A1 | 8/2013 | Pinto | |
| 2013/0208134 A1 | 8/2013 | Hamalainen | |
| 2013/0208942 A1 | 8/2013 | Davis | |
| 2013/0215220 A1 | 8/2013 | Wang | |
| 2013/0259399 A1 | 10/2013 | Ho | |
| 2013/0263002 A1 | 10/2013 | Park | |
| 2013/0283301 A1 | 10/2013 | Avedissian | |
| 2013/0287214 A1 | 10/2013 | Resch | |
| 2013/0287304 A1 | 10/2013 | Kimura | |
| 2013/0300939 A1 | 11/2013 | Chou | |
| 2013/0308921 A1 | 11/2013 | Budzinski | |
| 2013/0318443 A1 | 11/2013 | Bachman | |
| 2013/0343727 A1 | 12/2013 | Rav-Acha | |
| 2014/0026156 A1 | 1/2014 | Deephanphongs | |
| 2014/0064706 A1 | 3/2014 | Lewis, II | |
| 2014/0072285 A1 | 3/2014 | Shynar | |
| 2014/0093164 A1 | 4/2014 | Noorkami | |
| 2014/0096002 A1 | 4/2014 | Dey | |
| 2014/0105573 A1 | 4/2014 | Hanckmann | |
| 2014/0161351 A1 | 6/2014 | Yagnik | |
| 2014/0165119 A1 | 6/2014 | Liu | |
| 2014/0169766 A1 | 6/2014 | Yu | |
| 2014/0176542 A1 | 6/2014 | Shohara | |
| 2014/0193040 A1 | 7/2014 | Bronshtein | |
| 2014/0212107 A1 | 7/2014 | Saint-Jean | |
| 2014/0219634 A1 | 8/2014 | McIntosh | |
| 2014/0226953 A1 | 8/2014 | Hou | |
| 2014/0232818 A1 | 8/2014 | Carr | |
| 2014/0232819 A1 | 8/2014 | Armstrong | |
| 2014/0245336 A1 | 8/2014 | Lewis, II | |
| 2014/0300644 A1 | 10/2014 | Gillard | |
| 2014/0328570 A1 | 11/2014 | Cheng | |
| 2014/0341528 A1 | 11/2014 | Mahate | |
| 2014/0366052 A1 | 12/2014 | Ives | |
| 2014/0376876 A1 | 12/2014 | Bentley | |
| 2015/0015680 A1 | 1/2015 | Wang | |
| 2015/0022355 A1 | 1/2015 | Pham | |
| 2015/0029089 A1 | 1/2015 | Kim | |
| 2015/0049220 A1 | 2/2015 | Kuwata | |

(56) References Cited

U.S. PATENT DOCUMENTS

| | | |
|---|---|---|
| 2015/0058709 A1 | 2/2015 | Zaletel |
| 2015/0085111 A1 | 3/2015 | Lavery |
| 2015/0154452 A1 | 6/2015 | Bentley |
| 2015/0178915 A1 | 6/2015 | Chatterjee |
| 2015/0186073 A1 | 7/2015 | Pacurariu |
| 2015/0220504 A1 | 8/2015 | Bocanegra Alvarez |
| 2015/0254871 A1 | 9/2015 | Macmillan |
| 2015/0256746 A1 | 9/2015 | Macmillan |
| 2015/0256808 A1 | 9/2015 | Macmillan |
| 2015/0271483 A1 | 9/2015 | Sun |
| 2015/0287435 A1 | 10/2015 | Land |
| 2015/0294141 A1 | 10/2015 | Molyneux |
| 2015/0318020 A1 | 11/2015 | Pribula |
| 2015/0339324 A1 | 11/2015 | Westmoreland |
| 2015/0375117 A1 | 12/2015 | Thompson |
| 2015/0382083 A1 | 12/2015 | Chen |
| 2016/0005435 A1 | 1/2016 | Campbell |
| 2016/0005440 A1 | 1/2016 | Gower |
| 2016/0026874 A1 | 1/2016 | Hodulik |
| 2016/0027470 A1 | 1/2016 | Newman |
| 2016/0027475 A1 | 1/2016 | Hodulik |
| 2016/0029105 A1 | 1/2016 | Newman |
| 2016/0055885 A1 | 2/2016 | Hodulik |
| 2016/0088287 A1 | 3/2016 | Sadi |
| 2016/0098941 A1 | 4/2016 | Kerluke |
| 2016/0119551 A1 | 4/2016 | Brown |
| 2016/0180501 A1 | 6/2016 | Mallet |
| 2016/0217325 A1 | 7/2016 | Bose |
| 2016/0225405 A1 | 8/2016 | Matias |
| 2016/0225410 A1 | 8/2016 | Lee |
| 2016/0234345 A1 | 8/2016 | Roberts |
| 2016/0358603 A1 | 12/2016 | Azam |
| 2016/0366330 A1 | 12/2016 | Boliek |
| 2017/0006214 A1 | 1/2017 | Andreassen |

OTHER PUBLICATIONS

FFmpeg, "AVPacket Struct Reference," Doxygen, Jul. 20, 2014, 24 Pages, [online] [retrieved on Jul. 13, 2015] Retrieved from the internet <URL:https://www.ffmpeg.org/doxygen/2.5/group_lavf_decoding.html>.

FFmpeg, "Demuxing," Doxygen, Dec. 5, 2014, 15 Pages, [online] [retrieved on Jul. 13, 2015] Retrieved from the internet <URL:https://www.ffmpeg.org/doxygen/2.3/group_lavf_encoding.html>.

FFmpeg, "Muxing," Doxygen, Jul. 20, 2014, 9 Pages, [online] [retrieved on Jul. 13, 2015] Retrieved from the internet <URL: https://www.ffmpeg.org/doxyg en/2. 3/structA VP a ck et. html>.

Han et al., 'Deep Compression: Compressing Deep Neural Networks with Pruning, Trained Quantization and Huffman Coding, International Conference on Learning Representations 2016, 14 pgs.

He et al., 'Deep Residual Learning for Image Recognition,' arXiv:1512.03385, 2015,12 pgs.

Iandola et al., 'SqueezeNet: AlexNet-level accuracy with 50x fewer parameters and <0.5MB model size', arXiv:1602.07360v3 [cs.CV] Apr. 6, 2016 (9 pgs.).

Ioffe et al., 'Batch Normalization: Accelerating Deep Network Training by Reducing Internal Covariate Shift,' arXiv:1502.03167, 2015, 11 pgs.

Parkhi et al., 'Deep Face Recognition,' Proceedings of the British Machine Vision, 2015,12 pgs.

PCT International Preliminary Report on Patentability for PCT/US2015/023680, dated Oct. 4, 2016, 10 pages.

PCT International Search Reort for PCT/US15/18538 dated Jun. 16, 2015 (2 pages).

PCT International Search Report and Written Opinion for PCT/US15/12086 dated Mar. 17, 2016, 7 pages.

PCT International Search Report and Written Opinion for PCT/US15/18538, dated Jun. 16, 2015, 26 pages.

PCT International Search Report and Written Opinion for PCT/US16/31076, dated Aug. 8, 2016, 19 Pages.

PCT International Search Report for PCT/US15/23680 dated Aug. 3, 2015, 4 pages.

PCT International Search Report for PCT/US15/41624 dated Nov. 4, 2015, 5 pages.

PCT International Search Report for PCT/US17/16367 dated Apr. 14, 2017 (2 pages).

PCT International Written Opinion for PCT/US2015/041624, dated Dec. 17, 2015, 7 Pages.

Ricker, 'First Click: TomTom's Bandit camera beats GoPro with software' Mar. 9, 2016 URL: http://www.theverge. com/2016/3/9/11179298/tomtom-bandit-beats-gopro (6 pages).

Schroff et al., 'FaceNet: A Unified Embedding for Face Recognition and Clustering,' IEEE Conference on Computer Vision and Pattern Recognition (CVPR), 2016, 10 pgs.

Iran et al., 'Learning Spatiotemporal Features with 3D Convolutional Networks', arXiv:1412.0767 [cs.CV] Dec. 2, 2014 (9 pgs).

Yang et al., 'Unsupervised Extraction of Video Highlights Via Robust Recurrent Auto-encoders' arXiv:1510.01442v1 [cs.CV] Oct. 6, 2015 (9 pgs).

\* cited by examiner

VIRTUAL LENS SIMULATION FOR VIDEO AND PHOTO CROPPING

BACKGROUND

Technical Field

This disclosure relates to video editing, and more specifically, to simulating a virtual lens in a cropped image or video.

Description of the Related Art

It is often desirable to perform crop or zoom operations on high resolution images or video frames to extract a reduced field of view sub-frame. Particularly, for wide angle or spherical images or video, subjects in the originally captured content may appear very small. Furthermore, much of the captured field of view may be of little interest to a given viewer. Thus, cropping or zooming the content can beneficially obtain an image or video with the subject more suitably framed. Wide angle lens used to capture wide angle or spherical content may introduce the perception of distortion that tends to increase near the edges and corners of the captured frames due to the fact that the cameras are projecting content from a spherical world onto a rectangular display. Thus, cropping an image to extract a sub-frame near an edge or corner of a wide angle image capture may result in an image having significantly different distortion than a sub-frame extracted from a center of the image. Furthermore, the cropped image will have a different overall distortion effect than the original image. These distortion variations may be undesirable particularly when combining cropped sub-frames corresponding to different regions of a video (e.g., to track movement of a subject of interest), or combining cropped sub-frames with uncropped frames (e.g., to produce in zoom effect).

BRIEF DESCRIPTIONS OF THE DRAWINGS

The disclosed embodiments have other advantages and features which will be more readily apparent from the following detailed description of the invention and the appended claims, when taken in conjunction with the accompanying drawings, in which:

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

In an image or video capture system, a virtual lens is simulated when applying a crop or zoom effect to an input image or video. An input image or video frame is received that has a first field of view of a scene. The input image or video frame depicts the scene with an input lens distortion caused by lens characteristics of a lens used to capture the input image or video frame. A selection of a sub-frame representing a portion of the input image or video frame is obtained that has a second field of view of the scene smaller than the first field of view. The sub-frame is processed to remap the input lens distortion centered in the first field of view to a desired lens distortion in the sub-frame centered in the second field of view. The processed sub-frame is the outputted.

Effects of Camera Lens Curvature

Figure 1:
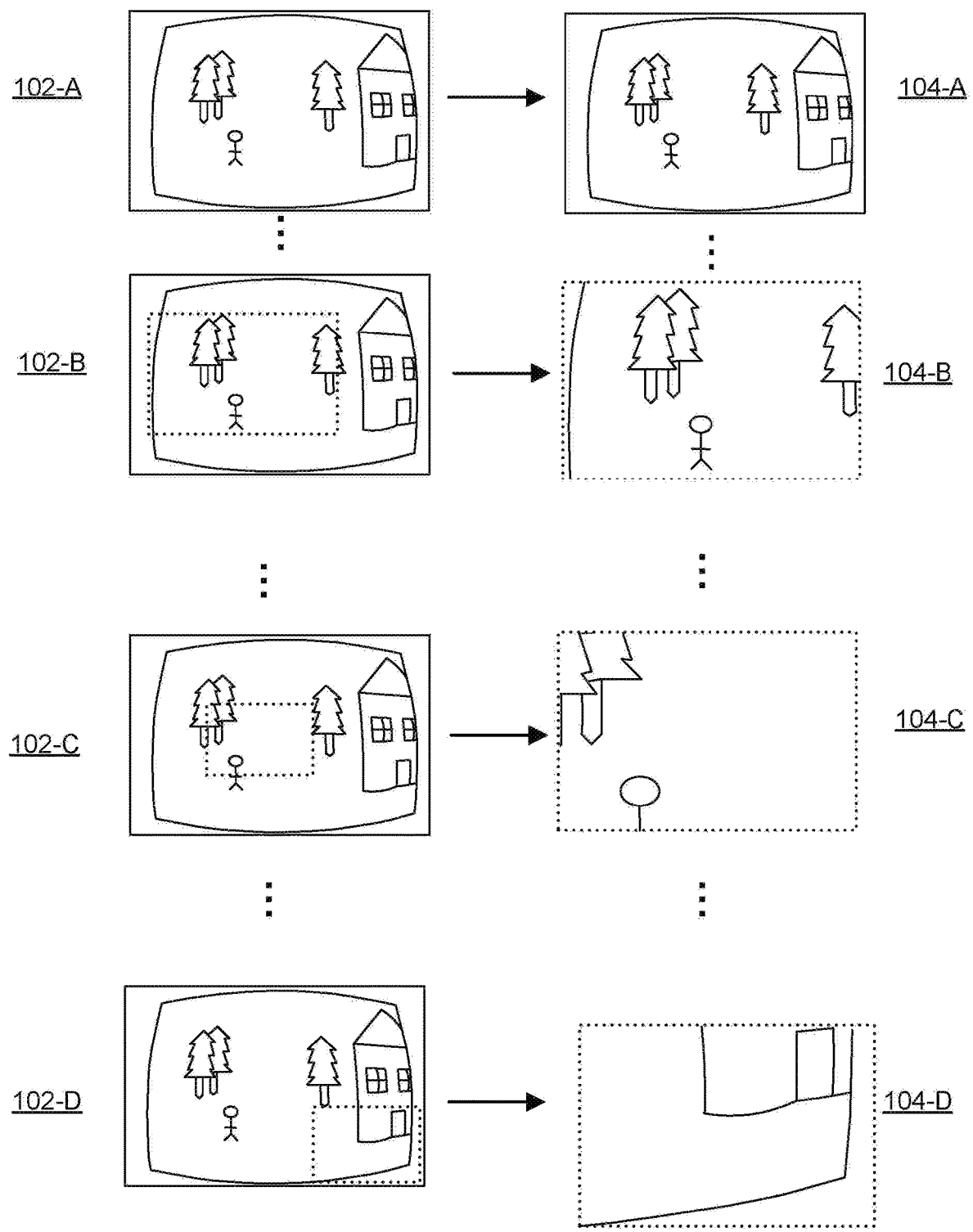
FIG. 1 illustrates example representations of input images and edited output images generated from the respective input images.

FIG. 1 illustrates example representations of images (e.g., images 102-A, 102-B, 102-C, 102-D) and output images (e.g., images 104-A, 104-B, 104-C, 104-D) generated from editing the original images 102. In an embodiment, the images 102 or 104 may comprise frames of video. For images or video captured using a wide angle lens, the projection of the captured images 102 onto a rectangular display may result in the appearance of increased distortion (e.g., curvature) in the edge and corner regions of the images 102 relative to the center region. For example, some wide angles lenses may produce a fisheye effect in which straight lines in the scene that are near the edge and corner regions of the image appear increasingly curved in the captured image. The output images may include zooming and/or panning effects in which a reduced field of view image may be extracted which may be of varying size and location in different images. For example, a zooming effect is introduced between images 104-A and 104-B to go from the original field of view in output image 104-A to a reduced field of view image in output image 104-B. The particular reduced field of view (e.g., a sub-frame) may be selected manually by a video editor in post-processing, or may be selected automatically to generate images or video likely to be of interest to a viewer based on various metadata. The metadata may also specify lens characteristics of the lens used to capture images or video frames. In another example, the image may be zoomed further in image 104-C and panned between image 104-C and 104-D (e.g., to track the movement of the person in a video). As a result of the wide angle lens introduced in the original images 102, different sub-frames may have completely different distortion characteristics from each other and from the original images 102. For example, sub-frames 104 taken from near the center of the captured image (e.g., sub-frame 104-C) may appear relatively undistorted and will not exhibit significant curvature around the edges (e.g., straight lines in the portion of the scene depicted by sub-frame 104-C may appear fairly straight in sub-frame 104-C), while sub-frames taken from the corner or edge regions of the image (e.g., sub-frame 104-D) may appear to have high curvature distortion (e.g., straight lines in the portion of the scene depicted by sub-frame 104-D may appear highly curved in sub-frame 104-D). Additionally, absent other processing, the distortion present in a given sub-frame 104 may appear differently depending on the size of the sub-frame and will not have the same lens characteristic (e.g., fisheye effect) as the originally captured image 102 from which it was derived.

When producing an output video or images from original content that includes cropping, zooming, re-pointing, and/or panning, it may be desirable for the output video or images to exhibit consistent lens characteristics. Thus, for example, it may be desirable for cropped sub-frames extracted from different portions of an original video to exhibit similar lens characteristics. Furthermore, it may be desirable for cropped sub-frames of different size to exhibit similar lens characteristics to each other and to the original uncropped video. Thus, to achieve this effect, a virtual lens model is applied to each of the extracted sub-frames 104 to produce consistent lens characteristics across each output image. As a result, the output images may simulate the same effect that would have been achieved by a camera operator manually re-orienting and/or physically moving the camera to produce the panning, re-pointing, cropping, and/or zooming effects. In one embodiment, the output images 104 may be processed so that the lens characteristics in the output images 104 match the characteristics naturally appearing in the original images 102. For example, each of the sub-frames 104-B, 104-C, 104-D may be processed to have a similar fisheye effect as the sub-frame 104-A as if the scenes depicted in sub-frames 104-B, 104-C, 104-D were natively captured in the same way as the original images 102. Alternatively, any desired lens characteristic may be applied that does not necessarily match the lens characteristic of the original image 102. In this way, a cohesive output video or set of images may be generated with consistent lens characteristics from frame-to-frame so that it is not apparent to the viewer that the panning, re-pointing, or zooming effects were created in post-processing instead of during capture. This process may be applied to any type of lens distortion including, for example, lens distortion characteristic of conventional lenses, wide angle lenses, fisheye lenses, zoom lenses, hemispherical lenses, flat lenses or other types of camera lenses.

Figure 2A:
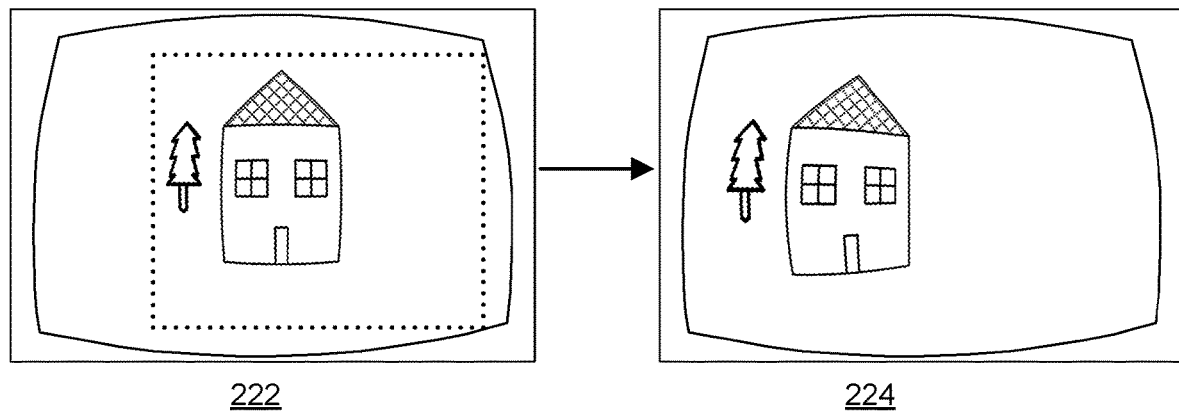
FIG. 2A illustrates an example embodiment of a re-pointing effect introduced into an image captured by a fisheye camera lens.

FIG. 2A illustrates an example of a virtual camera re-pointing in a camera that produces a fisheye wide angle projection. In the captured image 222, the camera is pointed at the center of the house. Thus, the straight lines of the house appear fairly straight in the image 222 although some curvature may appear with greater distance from the center of image 222. The camera may be virtually re-pointed (e.g., in post-processing) to center the shot to the right of the house, either by panning or re-pointing the view window or cropping the view as shown by the dotted lines to produce the image 224. In image 224, the same scene is shown but with the view now centered to the right of the house. As can be seen, the lens distortion may be centered in image 224 so that straight lines of the house (which is no longer centered) may appear to have greater curvature. The image 224 may be generated from the image 222 and may simulate an image that would have been captured by the camera if the scene had been captured with the camera pointed to the location to the right of the house. As will be apparent, the virtual repointing of the camera creates a very different curvature effect than if original image 222 was simply cropped to re-center at the new location.

Figure 2B:
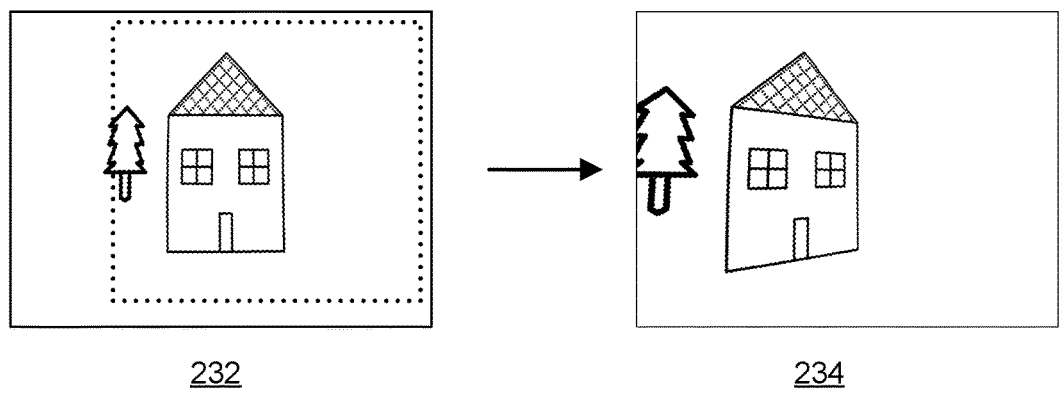
FIG. 2B illustrates an example embodiment of a re-pointing effect introduced into an image captured by a rectilinear camera lens.

FIG. 2B illustrates another example in a camera that produces a rectilinear projection instead of a fisheye projection. In image 232, the camera is pointed at the center of the house. Image 234 is generated by virtually re-pointing the camera to re-center the scene at a point to the right of the house, thus introducing some perceived distortion in the depiction of the house. The image 234 may be generated from the image 232 and simulates an image that would have been captured by the camera if the scene had been captured with the camera pointed to the location to the right of the house.

Example Media Processing System

Figure 3:
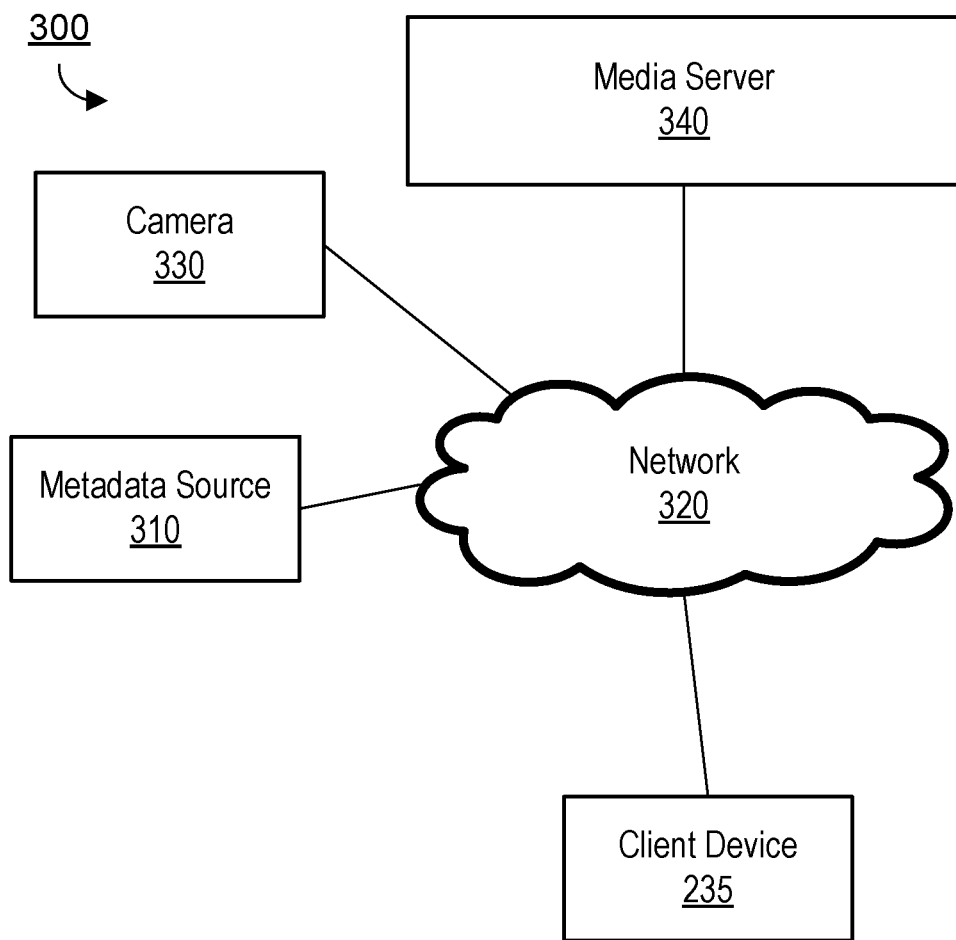
FIG. 3 illustrates an example network environment for capturing and editing images or video.

FIG. 3 is a block diagram of a media processing system 300, according to one embodiment. The media content system 300 may include one or more metadata sources 310, a network 320, a camera 330, a client device 335 and a media server 340. In alternative configurations, different and/or additional components may be included in the media content system 300. Examples of metadata sources 310 may include sensors (such as accelerometers, speedometers, rotation sensors, GPS sensors, altimeters, and the like), camera inputs (such as an image sensor, microphones, buttons, and the like), and data sources (such as clocks, external servers, web pages, local memory, and the like). In some embodiments, one or more of the metadata sources 310 can be included within the camera 330. Alternatively, one or more of the metadata sources 310 may be integrated with a client device or another computing device such as, for example, a mobile phone.

The camera 330 can include a camera body, one or more a camera lenses, various indicators on the camera body (such as LEDs, displays, and the like), various input mechanisms (such as buttons, switches, and touch-screen mechanisms), and electronics (e.g., imaging electronics, power electronics, metadata sensors, etc.) internal to the camera body for capturing images via the one or more lenses and/or performing other functions. In one embodiment, the camera 330 may be capable of capturing spherical or substantially spherical content. As used herein, spherical content may include still images or video having spherical or substantially spherical field of view. For example, in one embodiment, the camera 330 may capture an image or video having a 360 degree field of view in the horizontal plane and a 180 degree field of view in the vertical plane. Alternatively, the camera 330 may capture substantially spherical images or video having less than 360 degrees in the horizontal direction and less than 180 degrees in the vertical direction (e.g., within 10% of the field of view associated with fully spherical content). In other embodiments, the camera 330 may capture images or video having a non-spherical wide angle field of view.

As described in greater detail in conjunction with FIG. 4 below, the camera 330 can include sensors to capture metadata associated with video data, such as timing data, motion data, speed data, acceleration data, altitude data, GPS data, and the like. In a particular embodiment, location and/or time centric metadata (geographic location, time, speed, etc.) can be incorporated into a media file together with the captured content in order to track the location of the camera 330 over time. This metadata may be captured by the camera 330 itself or by another device (e.g., a mobile phone) proximate to the camera 330. In one embodiment, the metadata may be incorporated with the content stream by the camera 330 as the content is being captured. In another embodiment, a metadata file separate from the images or video file may be captured (by the same capture device or a different capture device) and the two separate files can be combined or otherwise processed together in post-processing. Furthermore, in one embodiment, metadata identifying the lens characteristics may be stored together with the image or video so that in post-processing, a post-processing editor may determine what type of lens distortion may be present in the captured image or video.

The media server 340 may receive and store images or video captured by the camera 330 and may allow users to access images or videos at a later time. In one embodiment, the media server 340 may provide the user with an interface, such as a web page or native application installed on the client device 335, to interact with and/or edit the stored images or videos and to generate output images or videos relevant to a particular user from one or more stored images or videos. At least some of output images or video frames may have a reduced field of view relative to the original images or video frames so as to produce zooming, re-pointing, and/or panning effect. To generate the output images or video, the media server 340 may extract a sequence of relevant sub-frames having the reduced field of view from the original images or video frames. For example, sub-frames may be selected from one or more input images or video frames to generate output images or video that tracks a path of a particular individual or object. In one embodiment, the media server 340 can automatically identify sub-frames by identifying spherical images or video captured near a particular location and time where a user was present (or other time and location of interest). In another embodiment, a time-varying path (e.g., a sequence of time-stamped locations) of a target (e.g., a person, object, or other scene of interest) can be used to automatically find spherical video having time and location metadata closely matching the path. Furthermore, by correlating the relative location of the camera 330 with a location at each time point in the path of interest, the media server 340 may automatically determine a direction between the camera 330 and the target and thereby automatically select the appropriate sub-frames depicting the target. In other embodiments, the media server 340 can automatically identify sub-frames of interest based on the image or video content itself or an associated audio track. For example, facial recognition, object recognition, motion tracking, or other content recognition or identification techniques may be applied to the video to identify sub-frames of interest. Alternatively, or in addition, a microphone array may be used to determine directionality associated with a received audio signal, and the sub-frames of interest may be chosen based on the direction between the camera and the audio source. These embodiments beneficially can be performed without any location tracking of the target of interest. Furthermore, in one embodiment, after the media server 340 identifies sub-frames of interest, the media server 340 automatically obtains a sub-frame center location, a sub-frame size, and a scaling factor for transforming the input image based on the metadata associated with the input image or based on image characteristics of the input image (e.g., time and location of interest, target of interest, the image or video content itself or an associated audio track). The scaling factor is defined as a ratio of a size of the input image to the sub-frame size. The media server 340 applies the crop or zoom effect applied to the input image based on the sub-frame center location, sub-frame size, and the scaling factor to generate the sub-frame. Further still, any of the above techniques may be used in combination to automatically determine which sub-frames to select for generating output images or video. In other embodiments, the selection of sub-frames may be performed manually using post-processing tools, e.g., image or video editing tools. In some embodiments, the media server 340 obtains metadata associated with the input image. The metadata at least specifies the lens characteristics of the lens to capture the input image. The media server 340 processes the sub-frame using the lens characteristics specified in the metadata. For example, the media server 340 processes the sub-frame to remap the input lens distortion centered in a first field of view of the input image to a desired lens distortion in the sub-frame centered in a second field of view of the sub-frame. The second field of view of the sub-frame is smaller than the first field of view. The desired lens distortion exhibits consistent lens characteristics with those in the input image. The media server 340 outputs the processed sub-frame with the same size as the input image.

A user can interact with interfaces provided by the media server 340 via the client device 335. The client device 335 may be any computing device capable of receiving user inputs as well as transmitting and/or receiving data via the network 320. In one embodiment, the client device 335 may comprise a conventional computer system, such as a desktop or a laptop computer. Alternatively, the client device 335 may comprise a device having computer functionality, such as a personal digital assistant (PDA), a mobile telephone, a smartphone or another suitable device. The user can use the client device 335 to view and interact with or edit videos or images stored on the media server 340. For example, the user can view web pages including summaries for a set of videos or images captured by the camera 330 via a web browser on the client device 335.

One or more input devices associated with the client device 335 may receive input from the user. For example, the client device 335 can include a touch-sensitive display, a keyboard, a trackpad, a mouse, a voice recognition system, and the like. In some embodiments, the client device 335 can access videos, images, and/or metadata from the camera 330 or one or more metadata sources 310, and can transfer the accessed metadata to the media server 340. For example, the client device may retrieve videos or images and metadata associated with the videos or images from the camera via a universal serial bus (USB) cable coupling the camera 330 and the client device 335. The client device 335 can then upload the retrieved videos and metadata to the media server 340. In one embodiment, the client device 335 may interact with the video server 340 through an application programming interface (API) running on a native operating system of the client device 335, such as IOS® or ANDROID™. While FIG. 3 shows a single client device 335, in various embodiments, any number of client devices 335 may communicate with the media server 340.

The media server 340 may communicate with the client device 335, the metadata sources 310, and the camera 330 via the network 320, which may include any combination of local area and/or wide area networks, using both wired and/or wireless communication systems. In one embodiment, the network 320 may use standard communications technologies and/or protocols. In some embodiments, the processes attributed to the client 335 or media server 340 herein may instead by performed within the camera 330.

Various components of the environment 300 of FIG. 3 such as the camera 330, metadata source 310, media server 340, and client device 325 can include one or more processors and a non-transitory computer-readable storage medium storing instructions therein that when executed cause the processor to carry out the functions attributed to the respective devices described herein.

Example Camera Configuration

Figure 4:
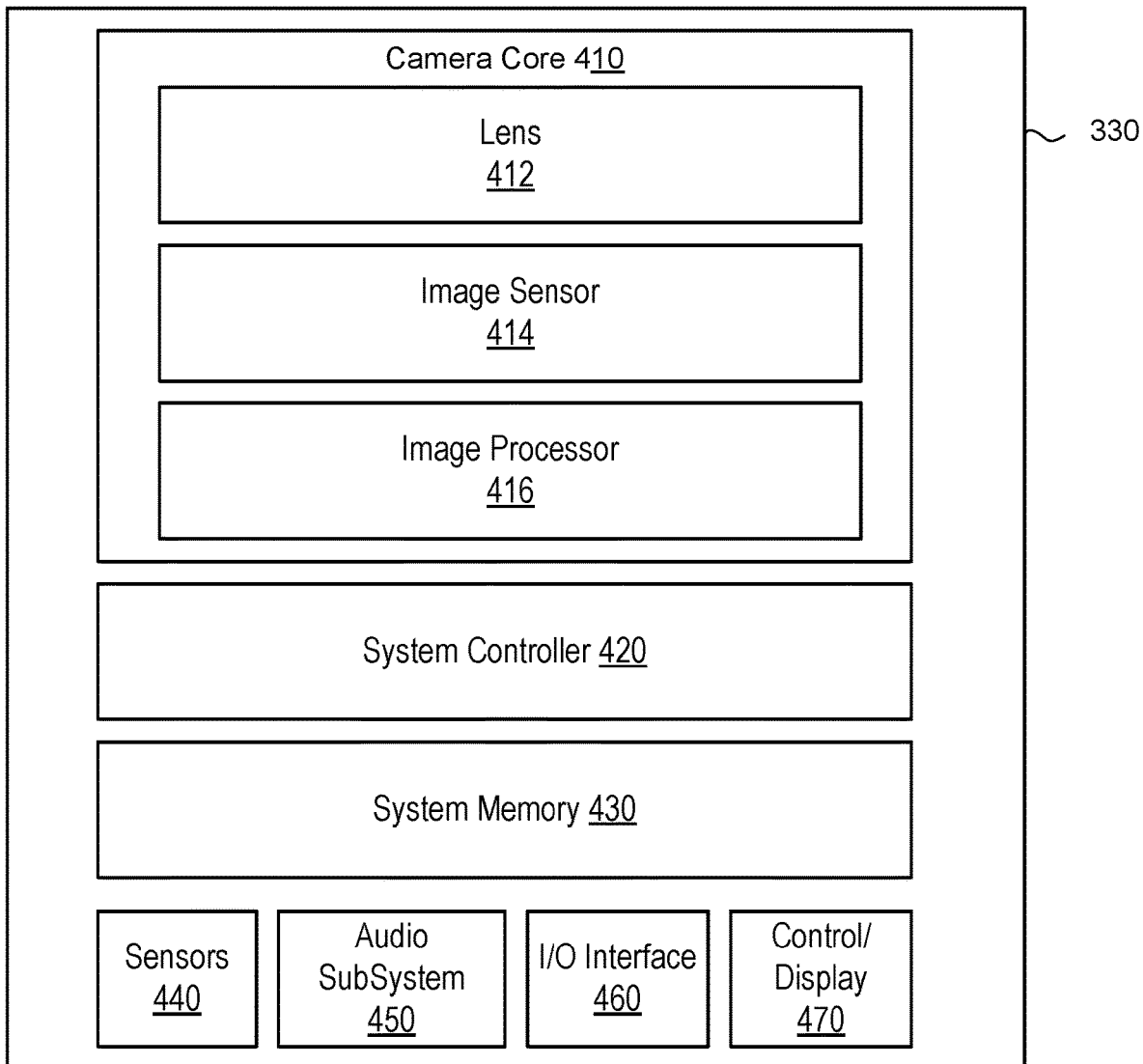
FIG. 4 illustrates an example architecture of a camera.

FIG. 4 is a block diagram illustrating a camera 330, according to one embodiment. In the illustrated embodiment, the camera 330 may comprise a camera core 410 comprising a lens 412, an image sensor 414, and an image processor 416. The camera 330 may additionally include a system controller 420 (e.g., a microcontroller or microprocessor) that may control the operation and functionality of the camera 330 and system memory 430 that may be configured to store executable computer instructions that, when executed by the system controller 420 and/or the image processors 416, may perform the camera functionalities described herein. In some embodiments, a camera 330 may include multiple camera cores 410 to capture fields of view in different directions which may then be stitched together to form a cohesive image. For example, in an embodiment of a spherical camera system, the camera 330 may include two camera cores 410 each having a hemispherical or hyperhemispherical lens that each captures a hemispherical or hyperhemispherical field of view which are stitched together in post-processing to form a spherical image.

The lens 412 can be, for example, a wide angle lens, hemispherical, or hyperhemispherical lens that focuses light entering the lens to the image sensor 414 which captures images and/or video frames. As described above, different lens may produce different lens distortion effects in different portions of the image or video frame due to different lens characteristics. For example, the lens characteristics may cause straight lines in the image of a scene to appear as curved lines in at least a portion of the image or video frame. In another example, the lens characteristics may change orientations of straight lines in an image of the scene. In such an example, the vertical or horizontal straight lines may appear to be oblique lines in the image of the scene. In another example, the lens characteristics may cause lines of the same length in the scene to appear to be different lengths in different portions of the image or video frame. The lens characteristics may be based on an optical design of the lens. Examples of lens characteristics that may affect the lens distortion may include, for example, a focal length, an f-number, a field of view, a magnification, a numerical aperture, a resolution, a working distance, an aperture size, lens materials, lens coatings, or other lens characteristics. Different types of lens may have different lens characteristics causing different distortions. For example, a conventional lens may have a fixed focal length (e.g., greater than 50 mm) and produces a "natural" field of view that may look natural to observers from a normal view distance. A wide angle lens may have a shorter focal length (e.g., less than 40 mm) than the one of conventional lens and may produce a wide field of view (also referred to as an expanded field of view). The types of the wide angle lens may include rectilinear wide-angle lens and a fisheye lens. The rectilinear wide-angle lens may produce a wide field of view that yields images of a scene in which straight lines in the scene appear as straight lines in the image. The fisheye lens produces a wider field of view than the rectilinear wide-angle lens and may cause straight lines in the scene to appear as curved lines in the image in at least a portion of the image. A hemispherical lens (which may be a type of fisheye lens) may produce a hemispherical field of view. A zoom lens may magnify a scene so that objects in the scene appear larger than in the image. A flat may have a flat shape that introduces other types of distortion into the image.

The image sensor 414 may capture high-definition images or video having a resolution of, for example, 720p, 1080p, 4k, or higher. In one embodiment, spherical video or images may be captured as a 5760 pixels by 2880 pixels with a 360 degree horizontal field of view and a 180 degree vertical field of view. For video, the image sensor 414 may capture video at frame rates of, for example, 30 frames per second, 60 frames per second, or higher. The image processor 416 may perform one or more image processing functions of the captured images or video. For example, the image processor 416 may perform a Bayer transformation, demosaicing, noise reduction, image sharpening, image stabilization, rolling shutter artifact reduction, color space conversion, compression, or other in-camera processing functions. Processed images and video may be temporarily or persistently stored to system memory 430 and/or to a non-volatile storage, which may be in the form of internal storage or an external memory card.

An input/output (I/O) interface 460 may transmit and receive data from various external devices. For example, the I/O interface 460 may facilitate the receiving or transmitting video or audio information through an I/O port. Examples of I/O ports or interfaces may include USB ports, HDMI ports, Ethernet ports, audioports, and the like. Furthermore, embodiments of the I/O interface 460 may include wireless ports that can accommodate wireless connections. Examples of wireless ports include Bluetooth, Wireless USB, Near Field Communication (NFC), and the like. The I/O interface 460 may also include an interface to synchronize the camera 330 with other cameras or with other external devices, such as a remote control, a second camera, a smartphone, a client device 235, or a media server 340.

A control/display subsystem 470 may include various control and display components associated with operation of the camera 330 including, for example, LED lights, a display, buttons, microphones, speakers, and the like. The audio subsystem 450 may include, for example, one or more microphones and one or more audio processors to capture and process audio data correlated with video capture. In one embodiment, the audio subsystem 450 may include a microphone array having two or microphones arranged to obtain directional audio signals.

Sensors 440 may capture various metadata concurrently with, or separately from, video or image capture. For example, the sensors 440 may capture time-stamped location information based on a global positioning system (GPS) sensor, and/or an altimeter. Other sensors 440 may be used to detect and capture orientation of the camera 330 including, for example, an orientation sensor, an accelerometer, a gyroscope, or a magnetometer. Sensor data captured from the various sensors 440 may be processed to generate other types of metadata. For example, sensor data from the accelerometer may be used to generate motion metadata, comprising velocity and/or acceleration vectors representative of motion of the camera 330. Furthermore, sensor data from the may be used to generate orientation metadata describing the orientation of the camera 330. Sensor data from the GPS sensor provides GPS coordinates identifying the location of the camera 330, and the altimeter measures the altitude of the camera 330. In one embodiment, the sensors 440 may be rigidly coupled to the camera 330 such that any motion, orientation or change in location experienced by the camera 330 may also be experienced by the sensors 440. The sensors 440 furthermore may associates a time stamp representing when the data was captured by each sensor. In one embodiment, the sensors 440 may automatically begin collecting sensor metadata when the camera 330 begins recording a video or captures an image.

Example Media Server Architecture

Figure 5:
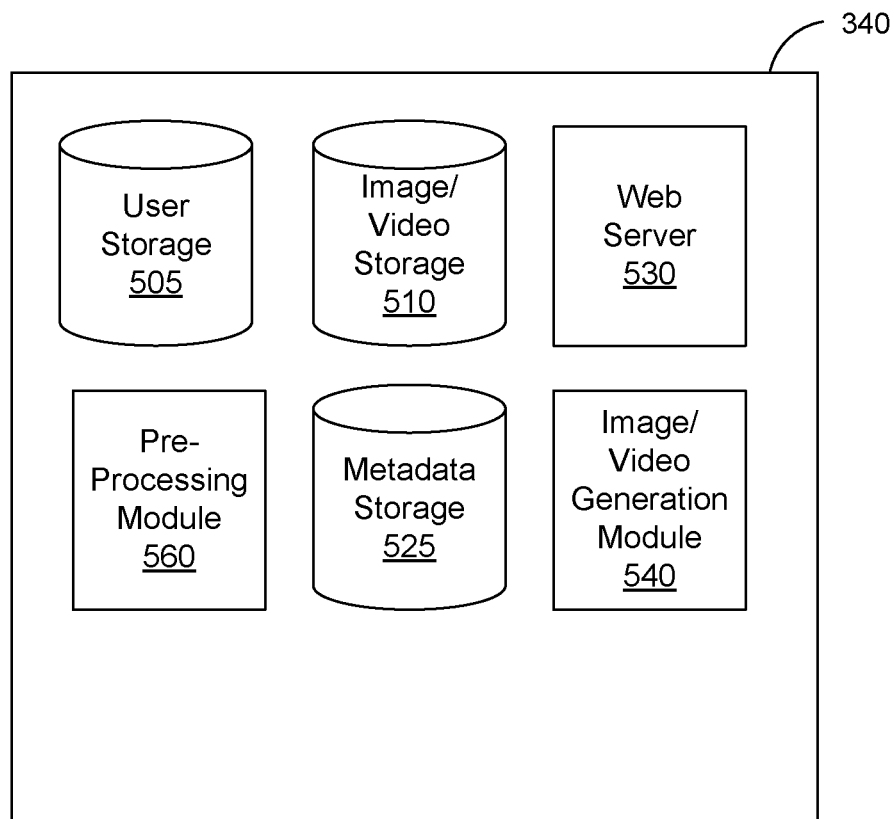
FIG. 5 illustrates an example embodiment of a video server.

FIG. 5 is a block diagram of an architecture of the media server 340. In the illustrated embodiment, the media server 340 may comprise a user storage 505, an image/video storage 510, a metadata storage 525, a web server 530, a image/video generation module 540, and a pre-processing module 560. In other embodiments, the media server 340 may include additional, fewer, or different components for performing the functionalities described herein. Conventional components such as network interfaces, security functions, load balancers, failover servers, management and network operations consoles, and the like are not shown so as to not obscure the details of the system architecture.

In an embodiment, the media server 340 may enable users to create and manage individual user accounts. User account information is stored in the user storage 505. A user account may include information provided by the user (such as biographic information, geographic information, and the like) and may also include additional information inferred by the media server 340 (such as information associated with a user's historical use of a camera and interactions with the media server 340). Examples of user information may include a username, contact information, a user's hometown or geographic region, other location information associated with the user, other users linked to the user as "friends," and the like. The user storage 505 may include data describing interactions between a user and videos captured by the user. For example, a user account can include a unique identifier associating videos uploaded by the user with the user's user account.

The image/video storage 510 may store videos or images captured and uploaded by users of the media server 340. The media server 340 may access videos or images captured using the camera 330 and store the videos or images in the image/video storage 510. In one example, the media server 340 may provide the user with an interface executing on the client device 335 that the user may use to upload videos or images to the image/video storage 510. In one embodiment, the media server 340 may index images and videos retrieved from the camera 330 or the client device 335, and may store information associated with the indexed images and videos in the image/video storage 510. For example, the media server 340 may provide the user with an interface to select one or more index filters used to index images or videos. Examples of index filters may include but are not limited to: the time and location that the image or video was captured, the type of equipment used by the user (e.g., ski equipment, mountain bike equipment, etc.), the type of activity being performed by the user while the image or video was captured (e.g., snowboarding, mountain biking, etc.), or the type of camera 330 used to capture the content.

In some embodiments, the media server 340 generates a unique identifier for each image or video stored in the image/video storage 510 which may be stored as metadata associated with the image or video in the metadata storage 525. In some embodiments, the generated identifier for a particular image or video may be unique to a particular user. For example, each user can be associated with a first unique identifier (such as a 10-digit alphanumeric string), and each image or video captured by a user may be associated with a second unique identifier made up of the first unique identifier associated with the user concatenated with an image or video identifier (such as an 8-digit alphanumeric string unique to the user). Thus, each image or video identifier may be unique among all images and videos stored at the image/video storage 510, and can be used to identify the user that captured the image or video.

The metadata storage 525 may store metadata associated with images or videos stored by the image/video storage 510 and with users stored in the user storage 505. Particularly, for each image or video, the metadata storage 525 may store metadata including time-stamped location information associated with each image or frame of the video to indicate the location of the camera 330 at any particular moment during capture of the content. Additionally, the metadata storage 525 may store other types of sensor data captured by the camera 330 in association with an image or video frame including, for example, gyroscope data indicating motion and/or orientation of the device. In some embodiments, metadata corresponding to an image or video may be stored within an image or video file itself, and not in a separate storage module. The metadata storage 525 may also store time-stamped location information associated with a particular user so as to represent a user's physical path during a particular time interval. This data may be obtained from a camera held by the user, a mobile phone application that tracks the user's path, or another metadata source. Furthermore, in one embodiment, the metadata storage 525 stores metadata specifying the lens characteristics with the image or video and metadata associated with the input image or image characteristics of the input image (e.g., time and location of interest, target of interest, the image or video content itself or an associated audio track).

The web server 530 may provide a communicative interface between the media server 340 and other entities of the environment of FIG. 3. For example, the web server 530 may access videos and associated metadata from the camera 330 or the client device 335 to store in the image/video storage 510 and the metadata storage 525, respectively. The web server 530 can also receive user input provided to the client device 335, can request automatically generated output images or videos relevant to the user generated from the stored video content. The web server 530 may furthermore include editing tools to enables users to edit images or videos stored in the video storage 510.

A pre-processing module 560 may pre-process and indexes uploaded images or videos. For example, in one embodiment, uploaded images or videos may be automatically processed by the pre-processing module 560 to conform the images or videos to a particular file format, resolution, etc. Furthermore, in one embodiment, the pre-processing module 560 may automatically parse the metadata associated with images or videos upon being uploaded.

The image/video generation module 540 may automatically generate output images or videos relevant to a user or to a particular set of inputs. For example, the image/video generation module 540 may generate an output video or sequence of images including content that tracks a sequence of locations representing a physical path over a particular time interval. Alternatively, the image/video generation module 440 may generate an output video or sequence of images including content that tracks a particular face or object identified in the images or video, tracks an area of motion having particular motion characteristics, tracks an identified audio source, etc. The output images or videos may have a reduced field of view (e.g., a standard non-spherical field of view) and represent relevant sub-frames to provide an image or video of interest. For example, the image or video may track a particular path of an individual, object, or other target so that each sub-frame depicts the target as the target moves through a given scene.

In some embodiments, image/video generation module 540 obtains metadata associated with the input image from metadata storage 525 and identifies sub-frames of interest.

The image/video generation module 540 automatically obtains a sub-frame center location, a sub-frame size, and a scaling factor for transforming the input image based on the metadata associated with the input image or image characteristics of the input image (e.g., time and location of interest, target of interest, the image or video content itself or an associated audio track). The image/video generation module 540 processes the sub-frame using the lens characteristics specified in the metadata and outputs the processed sub-frame with the same size as the input image.

In an embodiment, the media server 340 may enable the user to select from predefined image or video generation templates. For example, the user can request that the media server 340 generate a video or set of images based on location tracking, based on facial recognition, gesture recognition, audio tracking, motion detection, voice recognition, or other techniques. Various parameters used by the media server 340 to select relevant frames such as thresholds governing proximity distance and clip duration can be adjusted or pre-set.

Figure 6:
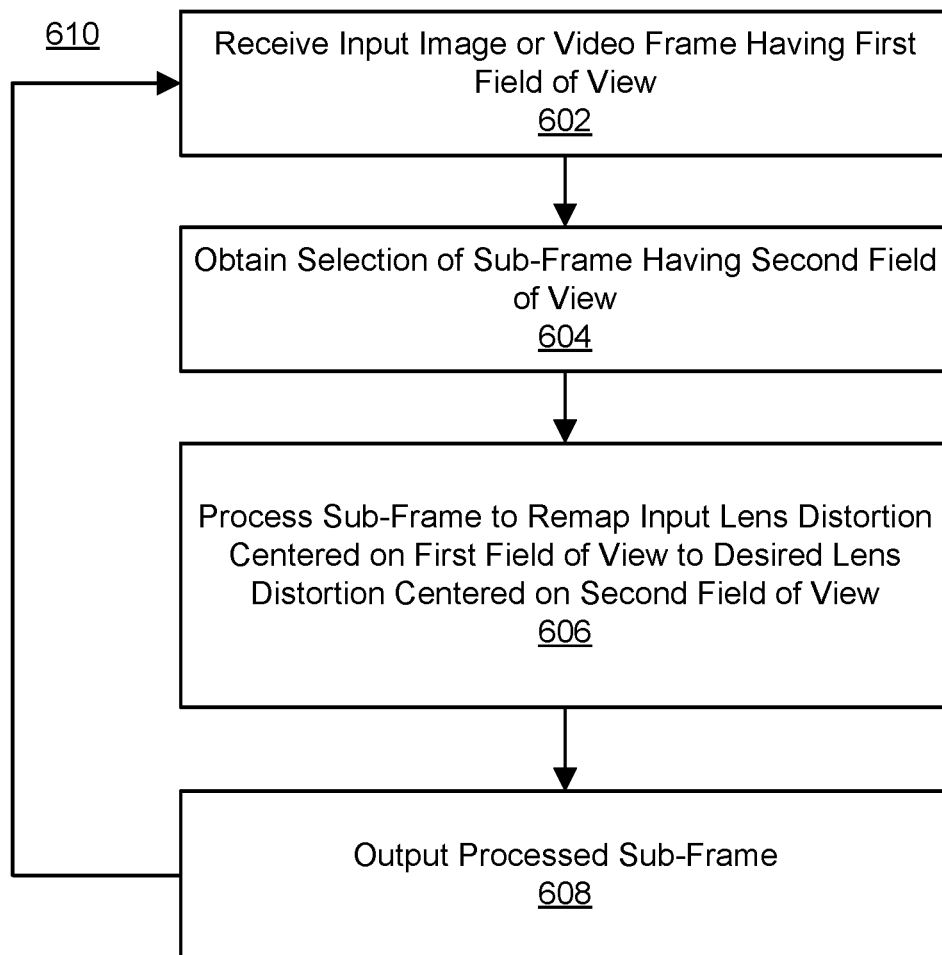
FIG. 6 illustrates an example embodiment of a process for simulating a virtual lens when applying a crop or zoom effect to an input video to generate an edited output video.

In an embodiment, the user interface may also provide an interactive viewer that enables the user to pan around within the content being viewed. This may allow the user to search for significant moments to incorporate into the output video or image and manually edit the automatically generated video or image. In one embodiment, the user interface enables various editing effects to be added to a generated output image or video. For example, the editing interface may enable effects such as, cut-away effects, panning, tilting, rotations, reverse angles, image stabilization, zooming, object tracking, Process for Virtual Lens Simulation FIG. 6 illustrates an example embodiment of a process for generating an output image or video using a virtual lens model. The media server 340 may receive 602 an input image or video frame depicting a scene, which may have a first field of view, such as, for example, a wide angle or spherical field of view. Furthermore, the input image may depict the scene with a lens distortion centered on the field of view of the input image. Thus, for example, if a fisheye lens is used, straight lines of the scene in the center of the input image may appear straight while straight lines of the scene near the edges of the input image may appear curved. The media server 340 may obtain 604 a selection of a sub-frame (e.g., either manually or automatically) comprising a second field of view which may be a reduced field relative to the input image or video frame. For example, the sub-frame may be selected as a re-pointing of the original input image or video frame, a crop of the original input image or video frame, or a zoomed in portion of the original input image or video frame. The sub-frame may be processed 606 to remap the input lens distortion centered on the first field of view of the original input image or video frame to a desired lens distortion centered on a second field of view of the sub-frame. This remapping may comprise a transformation that may have the same general effect as removing the existing lens distortion effect present in the sub-frame and then applying a desired lens distortion effect, but may do so by applying a direct mapping instead of two separate operations. For example, the remapping be achieved by applying a direct transformation function that describes a relationship between the input lens distortion of the input sub-frame (which may be centered on the original input image or video frame) and the desired lens distortion of the output sub-frame (which may be centered on the sub-frame). For example, in an embodiment, the single function transformation may be determined based on a combination (e.g., a product) of a first function to remove the lens distortion and convert the original input image or video frame to a rectilinear image, and a second function to apply the desired lens distortion. However, the transformation may be achieved without an intermediate step of converting to rectilinear. The direct mapping may enable the transformation to be achieved with higher quality and less loss than a comparable two-step process of separately removing the input distortion and then introducing the desired lens distortion. The transformed sub-frame may simulate the distortion that would be seen if the field of view of the sub-frame was originally captured by a camera having the desired lens distortion. In one embodiment, the desired lens distortion effect may match the lens distortion present in the initial input image or video frame prior to extracting the sub-frame, but may be re-centered on the sub-frame. In one embodiment, the function(s) may be determined based on metadata stored with the input image or video that specifies the type or characteristics of the lens used the capture the input image or video. The processed sub-frame is then outputted 508. The process may repeat 510 for each frame of an input video to generate an output video having the desired lens distortion effect or may be applied to each of a set of input images.

In an alternative embodiment, a two-step transformation may be used instead of a direct mapping. For example, based on known characteristics of the lens and the location and size of the selected sub-frame, an appropriate inverse function may be performed to remove the lens distortion present in the sub-frame. For example, if the original input image or video frame is captured with a fisheye lens, curvature in the areas of the sub-frame corresponding to the edges and corners of the original input image or video frame may be removed. The inverse function of the input lens distortion may be applied centered on the field of view of the original input image or video frame. As a result of applying the inverse function, the sub-frame may be transformed to a rectilinear image in which straight lines in the portion of the scene depicted in the sub-frame appear straight. Then, a desired lens distortion function centered at the center of the sub-frame may be applied to the rectilinear image to re-introduce a lens distortion effect.

Additional Configuration Considerations

Throughout this specification, some embodiments have used the expression "coupled" along with its derivatives. The term "coupled" as used herein is not necessarily limited to two or more elements being in direct physical or electrical contact. Rather, the term "coupled" may also encompass two or more elements are not in direct contact with each other, but yet still co-operate or interact with each other, or are structured to provide a thermal conduction path between the elements.

Likewise, as used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Upon reading this disclosure, those of skill in the art will appreciate still additional alternative structural and functional designs for the described embodiments as disclosed from the principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the scope defined in the appended claims.

The invention claimed is:

1. A system that simulates image distortion of a virtual lens in a video, the system comprising:
one or more processors; and
a non-transitory computer-readable storage medium storing instructions that when executed cause the one or more processors to perform steps including:
accessing input images, the input images including fields of view of a scene captured through a lens of a camera, the input images depicting the scene with an input lens distortion centered in the fields of view;
selecting sub-frames representing portions of the input images, the sub-frames including reduced fields of view of the scene smaller than the fields of view of the input images, the sub-frames including different lens distortion effects as a function of the input lens distortion present in the input images, different positions of areas of the input images included within the reduced fields of view, and a size of the areas of the input images included within the reduced fields of view; and
generating output images based on a desired lens distortion and the different lens distortion effects in the sub-frames, the desired lens distortion and the input lens distortion exhibiting consistent lens characteristics, wherein the output images include the sub-frames remapped from the input lens distortion centered in the fields of view of the input images to the desired lens distortion centered in the reduced fields of view to transform the different lens distortion effects present in the sub-frames to the desired lens distortion such that portions of the scene depicted in the sub-frames appear to have been captured using the reduced fields of view.

2. The system of claim 1, wherein image stabilization is applied to the input images.

3. The system of claim 1, wherein the sub-frames are selected based on metadata associated with the input images.

4. The system of claim 3, wherein the metadata indicates motion of the camera that captured the input images.

5. The system of claim 3, wherein the metadata indicates orientation of the camera that captured the input images.

6. The system of claim 1, wherein the output images are combined as video frames of an output video.

7. The system of claim 6, wherein remapping of the sub-frames from the input lens distortion centered in the fields of view of the input images to the desired lens distortion centered in the reduced fields of view results in the output video having consistent frame-to-frame lens characteristics.

8. The system of claim 7, wherein the different positions of the areas of the input images included within the reduced fields of view simulate virtual re-pointing of the camera using the reduced fields of view.

9. The system of claim 8, wherein the one or more processors and the non-transitory computer-readable storage medium are included in the camera.

10. The system of claim 9, wherein the lens includes a wide angle lens, and lens characteristics of the wide angle lens causes straight lines in the scene to appear as curved lines near edges of the input images.

11. A method for simulating image distortion of a virtual lens in a video, the method comprising:
accessing input images, the input images including fields of view of a scene captured through a lens of a camera, the input images depicting the scene with an input lens distortion centered in the fields of view;
selecting sub-frames representing portions of the input images, the sub-frames including reduced fields of view of the scene smaller than the fields of view of the input images, the sub-frames including different lens distortion effects as a function of the input lens distortion present in the input images, different positions of areas of the input images included within the reduced fields of view, and a size of the areas of the input images included within the reduced fields of view; and
generating output images based on a desired lens distortion and the different lens distortion effects in the sub-frames, the desired lens distortion and the input lens distortion exhibiting consistent lens characteristics, wherein the output images include the sub-frames remapped from the input lens distortion centered in the fields of view of the input images to the desired lens distortion centered in the reduced fields of view to transform the different lens distortion effects present in the sub-frames to the desired lens distortion such that portions of the scene depicted in the sub-frames appear to have been captured using the reduced fields of view.

12. The method of claim 11, wherein image stabilization is applied to the input images.

13. The method of claim 11, wherein the sub-frames are selected based on metadata associated with the input images.

14. The method of claim 13, wherein the metadata indicates motion of the camera that captured the input images.

15. The method of claim 13, wherein the metadata indicates orientation of the camera that captured the input images.

16. The method of claim 11, wherein the output images are combined as video frames of an output video.

17. The method of claim 16, wherein remapping of the sub-frames from the input lens distortion centered in the fields of view of the input images to the desired lens distortion centered in the reduced fields of view results in the output video having consistent frame-to-frame lens characteristics.

18. The method of claim 17, wherein the different positions of the areas of the input images included within the reduced fields of view simulate virtual re-pointing of the camera using the reduced fields of view.

19. The method of claim 18, wherein the method is performed by one or more processors included in the camera.

20. The method of claim 19, wherein the lens includes a wide angle lens, and lens characteristics of the wide angle lens causes straight lines in the scene to appear as curved lines near edges of the input images.

* * * * *